United States Patent
Lenz et al.

(10) Patent No.: US 11,390,038 B2
(45) Date of Patent: Jul. 19, 2022

(54) METHOD AND DEVICE FOR PRODUCING A BUTT-WELDED JOINT

(71) Applicant: Huerner Schweisstechnik GmbH, Muecke (DE)

(72) Inventors: Michael Lenz, Muecke (DE); Florian Kraus, Muecke (DE); Richard Early, Reiskirchen (DE)

(73) Assignee: Huerner Schweisstechnik GmbH, Muecke (DE)

( * ) Notice: Subject to any disclaimer, the term of this patent is extended or adjusted under 35 U.S.C. 154(b) by 0 days.

(21) Appl. No.: 17/064,239

(22) Filed: Oct. 6, 2020

(65) Prior Publication Data

US 2021/0107233 A1    Apr. 15, 2021

(30) Foreign Application Priority Data

Oct. 10, 2019    (EP) .................................. 19202442

(51) Int. Cl.
*B29C 65/00*    (2006.01)
*B29C 65/20*    (2006.01)
(Continued)

(52) U.S. Cl.
CPC ...... *B29C 65/2046* (2013.01); *B29C 66/5221* (2013.01); *F16L 13/02* (2013.01);
(Continued)

(58) Field of Classification Search
CPC ............ B29C 65/2046; B29C 65/2084; B29C 65/741; B29C 65/7419; B29C 65/7841;
(Continued)

(56) References Cited

U.S. PATENT DOCUMENTS 6,036,795 A * 3/2000 Sauron ................ B29C 65/2076
156/64
7,328,734 B2 * 2/2008 Bacik .................. B29C 65/7841
156/358
(Continued)

FOREIGN PATENT DOCUMENTS

CN       204585880 U    8/2015
CN       107031057 A    8/2017
(Continued)

OTHER PUBLICATIONS

Translation of CN204585880U (Year: 2015).*

*Primary Examiner* — Philip C Tucker
*Assistant Examiner* — Nickolas R Harm
(74) *Attorney, Agent, or Firm* — Dickinson Wright PLLC; Andrew D. Dorisio

(57) ABSTRACT

The invention relates to a method and to a device for producing a butt-welded joint between two pipe segments (38, 39) of a pipe (27, 28) made of a weldable plastic material, each pipe segment being held by a gripping means (14, 15), pipe end cross-sections of the pipe segments (38, 39) being machined with the aid of a tool means (11) for forming welding contact surfaces (40, 41), said tool means (11) being disposed in a stationary manner in a separating plane (37) for machining the welding contact surfaces (40, 41) and a separating cut for forming the pipe segments (38, 39) being realised by the gripping means (14, 15) moving the pipe (27, 28) relative to the tool means (11) in the separating plane (37), said separating cut simultaneously serving to form the welding contact surfaces (40, 41).

12 Claims, 6 Drawing Sheets

(51) Int. Cl.
*F16L 13/02* (2006.01)
*B29C 65/74* (2006.01)

(52) U.S. Cl.
CPC ............ *B29C 65/74* (2013.01); *B29C 65/741* (2013.01); *B29C 65/743* (2013.01); *B29C 65/745* (2013.01); *B29C 65/7419* (2013.01)

(58) Field of Classification Search
CPC ........... B29C 66/02241; B29C 66/1162; B29C 66/5223
See application file for complete search history.

(56) References Cited

U.S. PATENT DOCUMENTS

| | | | |
|---|---|---|---|
| 2006/0032349 A1* | 2/2006 | Temple ................... | B23B 5/167 83/13 |
| 2011/0008558 A1* | 1/2011 | Hayes, Jr. ............. | B29C 66/543 428/36.9 |
| 2013/0126088 A1* | 5/2013 | Wermelinger ...... | B29C 65/2092 156/296 |

FOREIGN PATENT DOCUMENTS

| | | | |
|---|---|---|---|
| DE | 2234976 A1 | 1/1974 | |
| DE | 102012207098 A1 | 10/2013 | |

* cited by examiner

Fig. 5
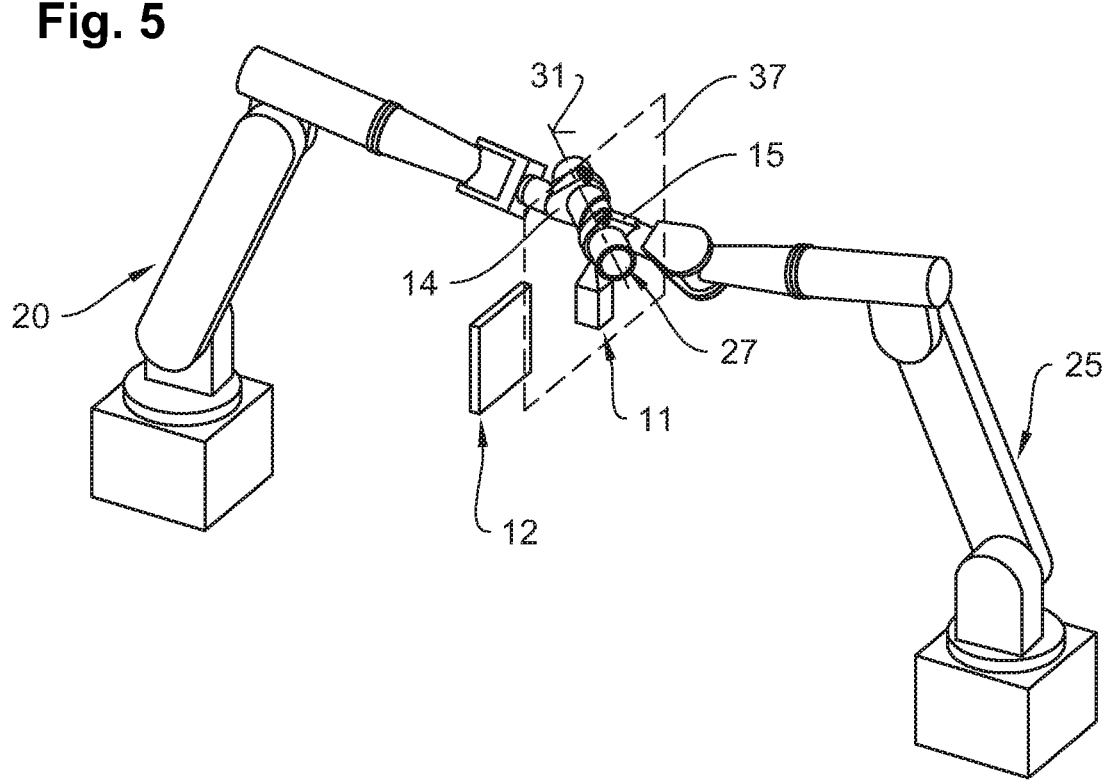
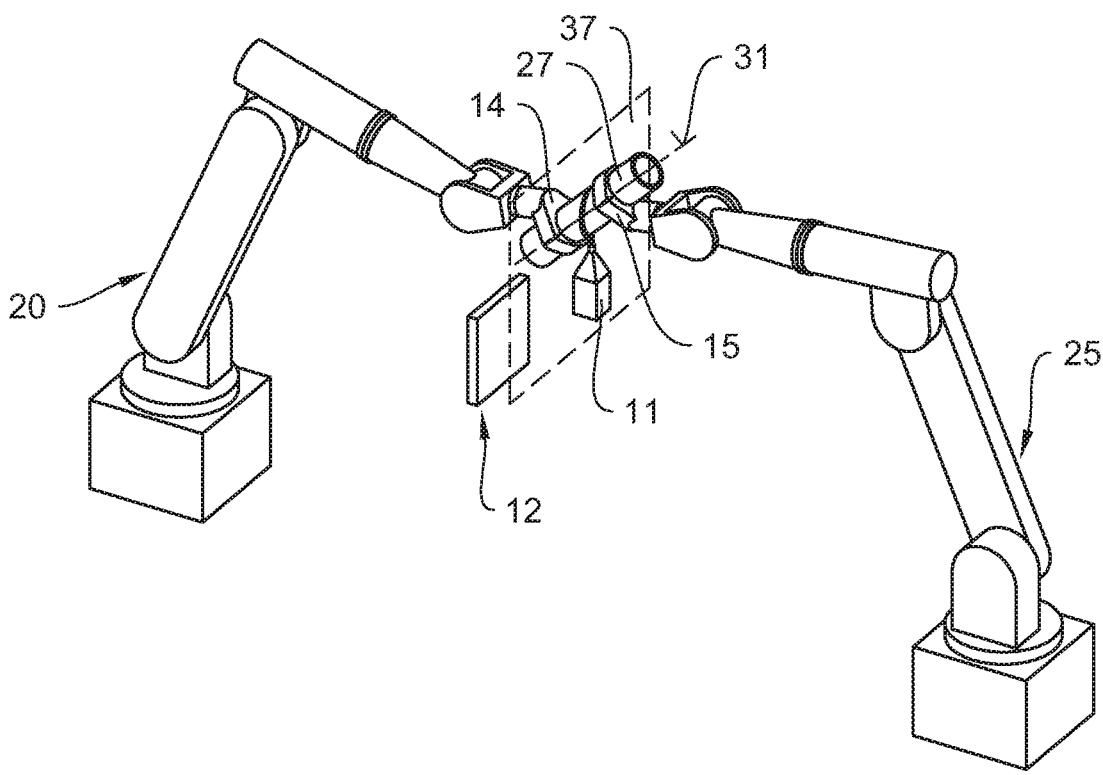
Fig. 6

Fig. 7
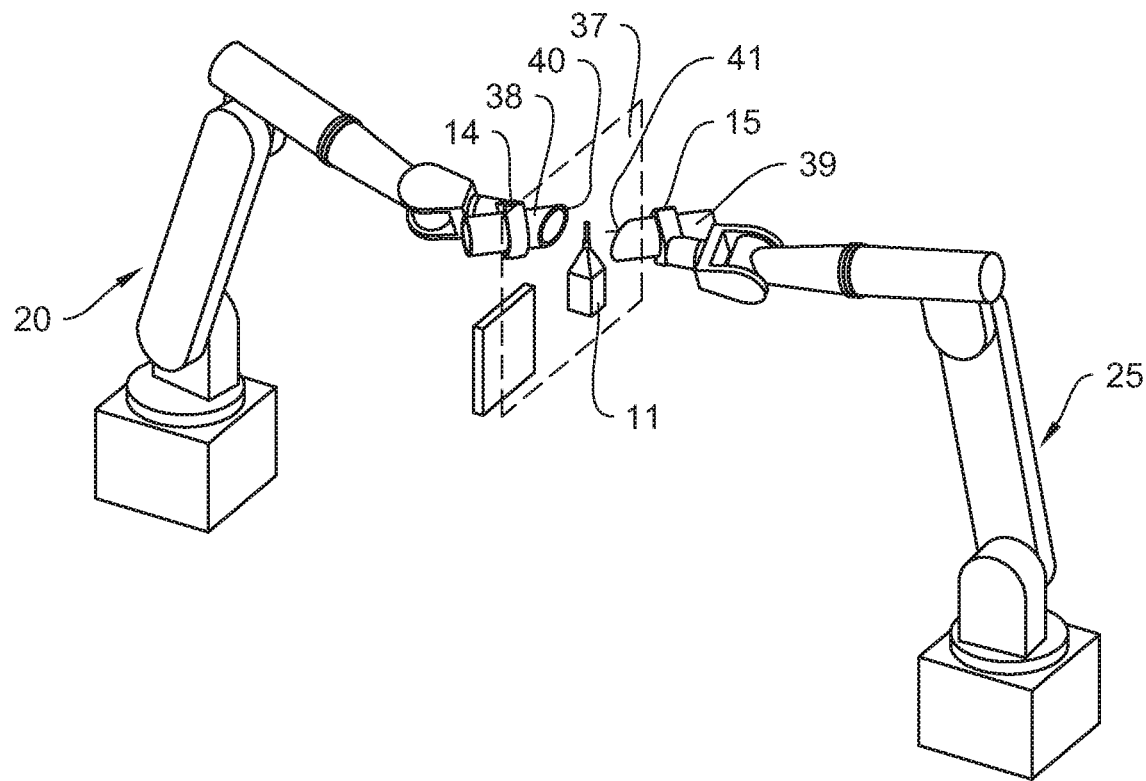
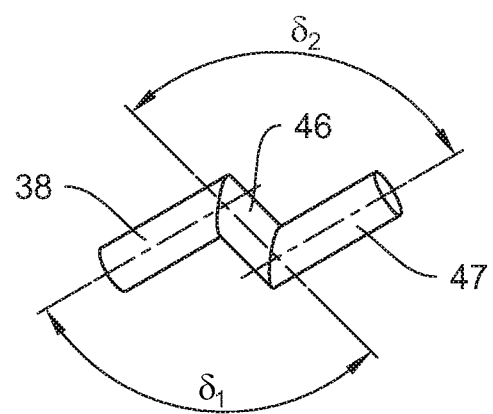
Fig. 11

METHOD AND DEVICE FOR PRODUCING A BUTT-WELDED JOINT

This application claims priority to European Patent Application No. 19202442.0, filed on Oct. 10, 2019, the disclosure of which is incorporated herein by reference.

FIELD OF THE INVENTION

The present invention relates to a method for producing a butt-welded joint between two pipe segments of a pipe made of a weldable plastic material, each pipe segment being held by a gripping means, pipe end cross-sections of the pipe segments being machined with the aid of a tool means for forming welding contact surfaces, said welding contact surfaces being melted by means of a heating means and in the following being pressed against each other with a joining pressure for forming a butt weld which connects the pipe segments with each other in a joining plane. Moreover, the invention relates to a device for carrying out the method.

BACKGROUND OF THE INVENTION

From DE 10 2012 207 098 A1, a method and a device for producing a butt-welded joint between two pipe segments of a plastic pipe which are each held by a gripping means are known, in this method a gripping means taking hold of each of the pipe segments which are produced by way of separating cuts before they are disposed in the device, and opposite pipe end cross-sections of the pipe segments being machined one after the other with the aid of a tool means in order to form welding contact surfaces. For employing the tool means, it is moved into a clearance formed between the welding contact surfaces in the device in order to process the pipe end cross-sections subsequently upon supplying of the pipe segments by the gripping means with an axial supply movement. After the machining has been carried out for producing the welding contact surfaces, the tool means is replaced by a contact heating appliance, which is moved into the clearance formed between the pipe segments like the tool means.

For generating the butt weld, the welding contact surfaces, which are melted by means of the contact heating appliance, are lastly pressed against each other with a joining pressure after the contact heating appliance has been removed from the clearance formed between the pipe segments. The finished pipe connection is then removed manually corresponding to the placement of the pipe segments in the device which was effected previously.

When using the known device, it has in particular proven to be disadvantageous that the preparation of the pipe segments as a condition for producing the butt-welded joint requires a plurality of manufacturing or operation steps, which lead to correspondingly long construction times in particular in plant construction in connection with the piping systems, which are often intricate and have a plurality of pipe connections.

OBJECT AND SUMMARY OF THE INVENTION

The object of the present invention is therefore to propose a method and a device which simplify the production of pipe connections between pipe segments of plastic pipes in terms of reducing the manufacturing and operation steps, thus making correspondingly shorter construction times in plant construction possible.

In order to attain this object, the method in accordance with the invention has the features of claim 1.

Corresponding to the method in accordance with the invention, the tool means is disposed in a stationary manner in a separating plane for machining the welding contact surfaces and a separating cut, for forming the pipe segments, is realised by the gripping means moving the pipe relative to the tool in the separating plane, said separating cut simultaneously serving to form the welding contact surfaces.

In accordance with the invention, the tool means, which generates the welding contact surfaces by machining the pipe end cross-sections, thus simultaneously serves to form the pipe segments by means of a separating cut cutting through the pipe. Here, the movement of the pipe relative to the tool means performed by the gripping means makes different orientations of the separating plane relative to a longitudinal pipe axis possible so that not only separating cuts in a separating plane which is disposed at an angle of 90° in relation to the longitudinal axis, but also any other separating angle can be set without the way how the pipe is held in the gripping means having to be changed.

It also proves to be particularly advantageous that arranging the tool means in a stationary manner for machining the welding contact surfaces makes it possible to employ a milling tool, which is in particular formed as an end mill, for simultaneously generating the pipe segments by separating the pipe in a separating plane and the surface finishing of the pipe end cross-sections for forming the welding contact surfaces in one process step.

In a preferred embodiment, each gripping means is guided by a handling means on a circular movement path in a movement plane which is parallel to the separating plane in order to perform the relative movement. Here, the longitudinal axis of the pipe tumbles in the separating plane while the separating cut is being realised, the tumbling angle corresponding to the inclination of the separating plane relative to the normal plane of the pipe. Thereby, separating cuts can be generated which make pipe connections having any pipe angle between 0° and 90° possible due to a following joining process of the pipe segments which are askew by 180° with respect to each other without the way in which the pipe segments are held in the gripping means having to be changed.

It is particularly advantageous if the pipe is grasped at a pipe end by a gripping means before the separating cut is realised and is displaced from a supply position into a processing starting position adjacent to the tool means, the second pipe end being grasped by the second gripping means in said processing starting position and both gripping means placing the pipe at the disposal of a cutting tool of the tool means for realising the separating cut.

In this way, it is not only possible to handle the pipe relative to the tool means by means by means of the gripping means, but it is also possible that one of the gripping means is used as a transfer means for withdrawing the pipe from a magazine means disposed in a supply position into a processing starting position.

It is particularly advantageous if the gripping means move each of the pipe segments until their welding contact surfaces are in contact with a heating surface of the heating means, which is disposed between the welding contact surfaces, after the separating cut has been realised.

In the case of a preferred embodiment of the heating means as a contact heating appliance, the welding contact surfaces are moved until they rest against the heating surfaces. In case the heating means is alternatively embodied as a radiant heating appliance, the welding contact surfaces can be positioned at a distance to the heating surfaces.

As has already been emphasised to be advantageous in connection with the tool means disposed in a stationary manner, supplying the pipe segments provided with the welding contact surfaces to a stationary heating means also proves to be advantageous since the focus can thus be put on effectiveness alone when realising the heating means, i.e. in particular on the heating-up time which can be achieved, without having to consider to the manageability or the possibilities of positioning the heating means.

If, after the welding contact surfaces have been heated, the welding contact surfaces are arranged opposite each other and parallel to each other and are moved against each other by way of a supply movement which is performed by at least one gripping means and serves to form a material connection in a joining plane, it is possible to freely choose the relative position of the joining plane relative to the separating plane and/or the heating means.

Preferably, the welding contact surfaces are heated up by means of a heating means which is disposed adjacent to the tool means in a stationary manner and the pipe segments are joined in a joining position adjacent to the heating means so that the paths the gripping means have to conduct with the pipe segments can be minimised.

It is also particularly advantageous if machining of the pipe end cross-sections for forming the welding contact surfaces, heating-up of the welding contact surfaces and joining of the welding contact surfaces take place in a common processing plane which is disposed between the handling means.

The device in accordance with the invention has the features of claim 8 in order to attain the object.

In the inventive device for producing a butt-welded joint between two pipe segments, the tool means is disposed in a stationary manner and the gripping means can be moved independently of each other in the direction of the spatial axes for handling the pipe segments relative to the tool means.

It is particularly advantageous if the heating means is disposed in a stationary manner and adjacent to the tool means.

Each of the gripping means is preferably disposed at a handling means having multiple movement axes, wherein it is particularly preferable if the handling means are formed as robots having at least five axes, wherein the gripping means have a sixth axis, in particular for performing a gripping movement. Embodying the handling means as a robot having six axes is particularly preferable.

If the tool means and the heating means are disposed in a common processing plane between the handling means which are each disposed in a stationary manner, it is possible to make the movement space of the handling means as small as possible so that robots having relatively small ranges make it already possible to perform the method in accordance with the invention.

The heating means can particularly advantageously be embodied as a contact heating means or radiant heating means.

BRIEF DESCRIPTION OF THE FIGURES

In the following, a preferred embodiment of the method including an illustration of a preferred embodiment of a device for carrying out the method is explained in more detail with reference to the drawing.

In the figures:

FIGS. 4-7 show the machining of the pipe for forming pipe segments;

FIG. 11 shows another exemplary embodiment of a pipe connection.

DETAILED DESCRIPTION

Figure 1:
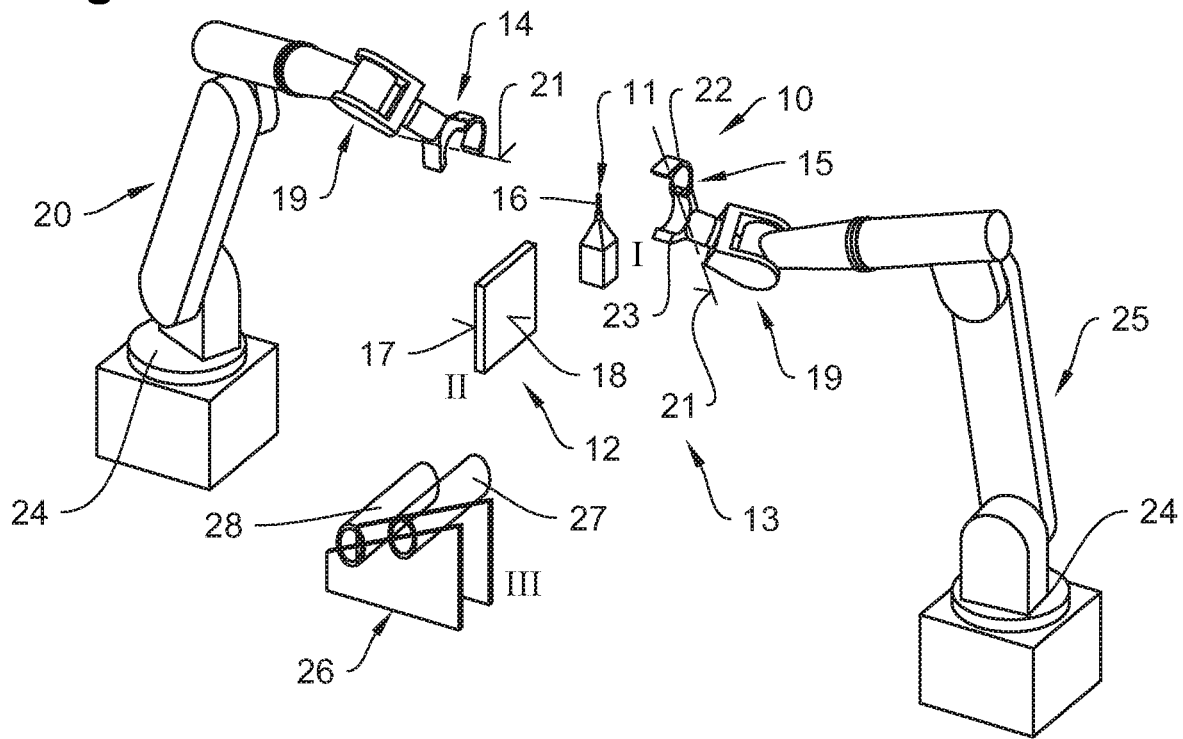
FIG. 1 shows a device for producing a butt-welded joint before a pipe is withdrawn from a magazine means.

FIG. 1 shows an embodiment of a butt-welding device 10 which, apart from a tool means 11 disposed in a stationary manner, has a contact heating appliance 12 also disposed in a stationary manner here as an essential component. Moreover, the butt-welding device 10 has two gripping means 14, 15 which can be moved in relation to each other and relative to the tool means 11 and the contact heating appliance 12 in an operating zone 13.

The tool means 11 is embodied as a machining tool means and has a tool which is embodied as an end mill 16 and which is in a defined tool position I within the operating zone 13. The contact heating appliance 12 has a contact heating surface 17 on an outer face and a contact heating surface 18 on another outer face and is situated adjacent to the tool means 11 in a heating position II defined within the operating zone 13.

Each of the gripping means 14, 15 is attached to a hand joint 19 of an articulated robot 20, 51 (embodied as a six axis robot here) and include a gripper axis 21 which makes it possible to open and close the gripping means by pivoting a gripping bracket 22 against a gripper base 23. The articulated robots 20, 25 make a defined positioning of the gripping means 14, 15 relative to the stationary tool means 11 and the stationary contact heating appliance 12 within the operating zone 13 possible.

Figure 2:
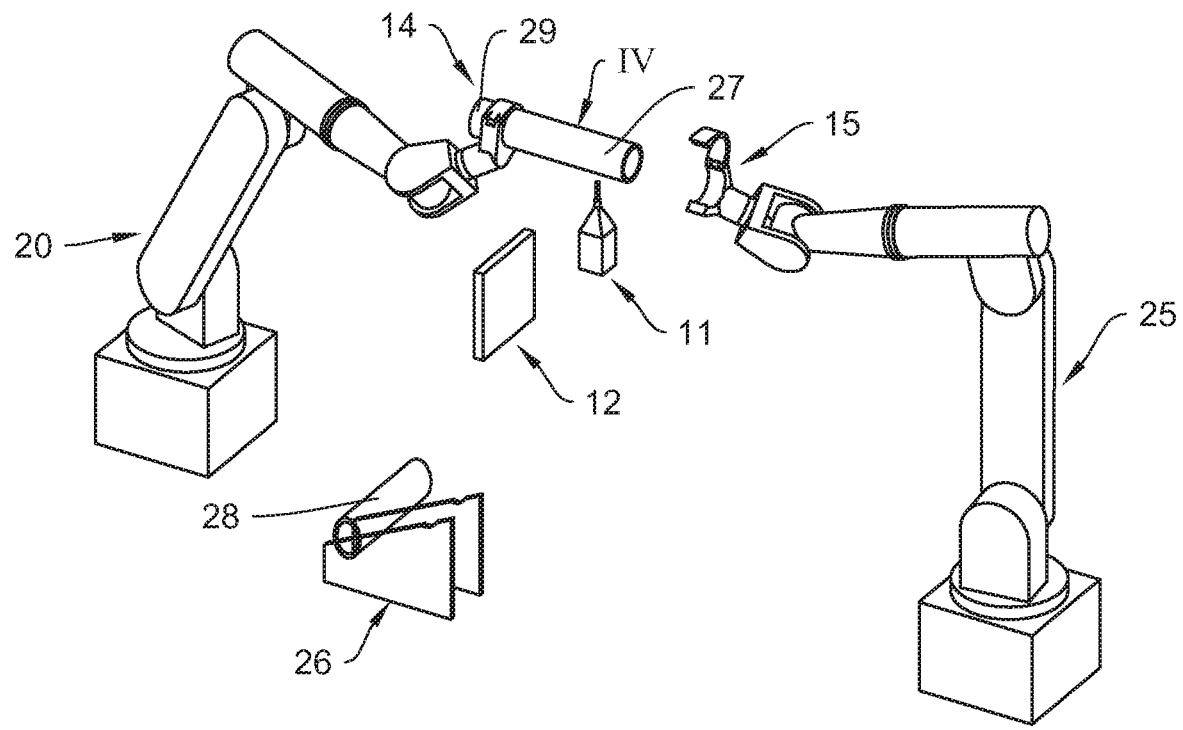
FIG. 2 shows the device illustrated in FIG. 1 after the pipe has been withdrawn from the magazine means.

As FIG. 1 furthermore shows, a magazine means 26 is located within the operating zone 13 next to the tool means 11 and the contact heating appliance 12, pipes 27, 28 which are manufactured from a weldable plastic material being situated in said magazine means in a supply position III from which the pipes 27, 28 can be withdrawn by means of the gripping means 14 and be transferred into a processing starting position IV illustrated in FIG. 2.

Figure 3:
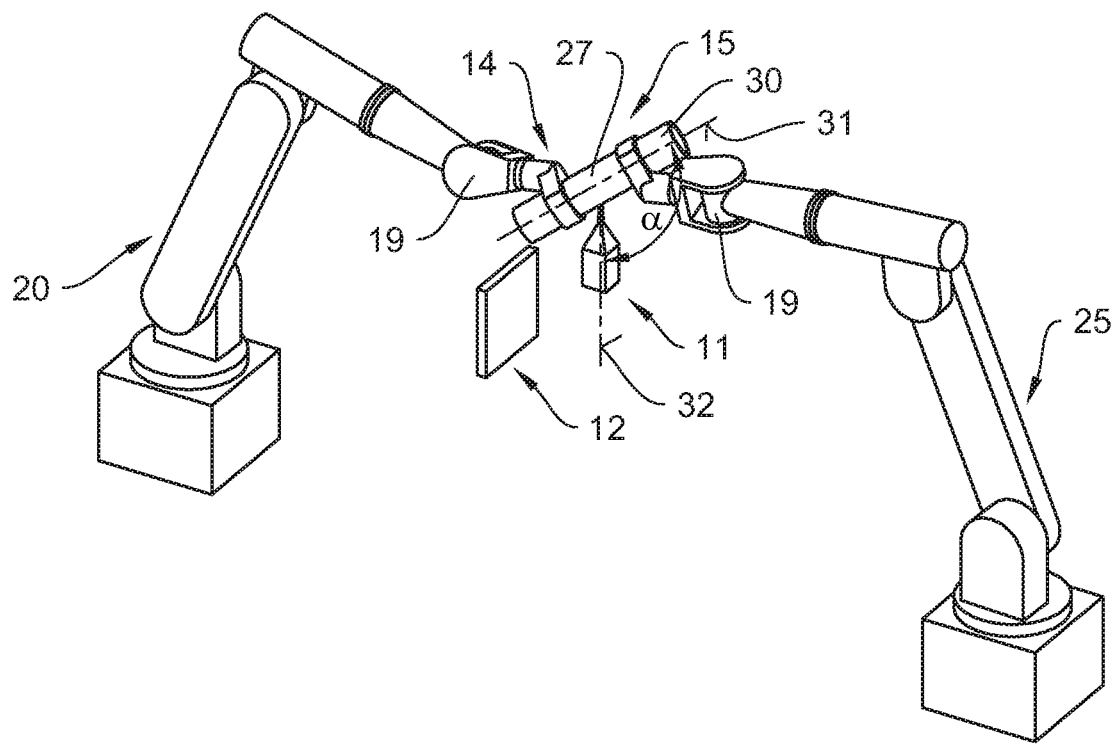
FIG. 3 shows the pipe which has been positioned in a processing position at a tool means by two gripping means of the device.
Figure 4:
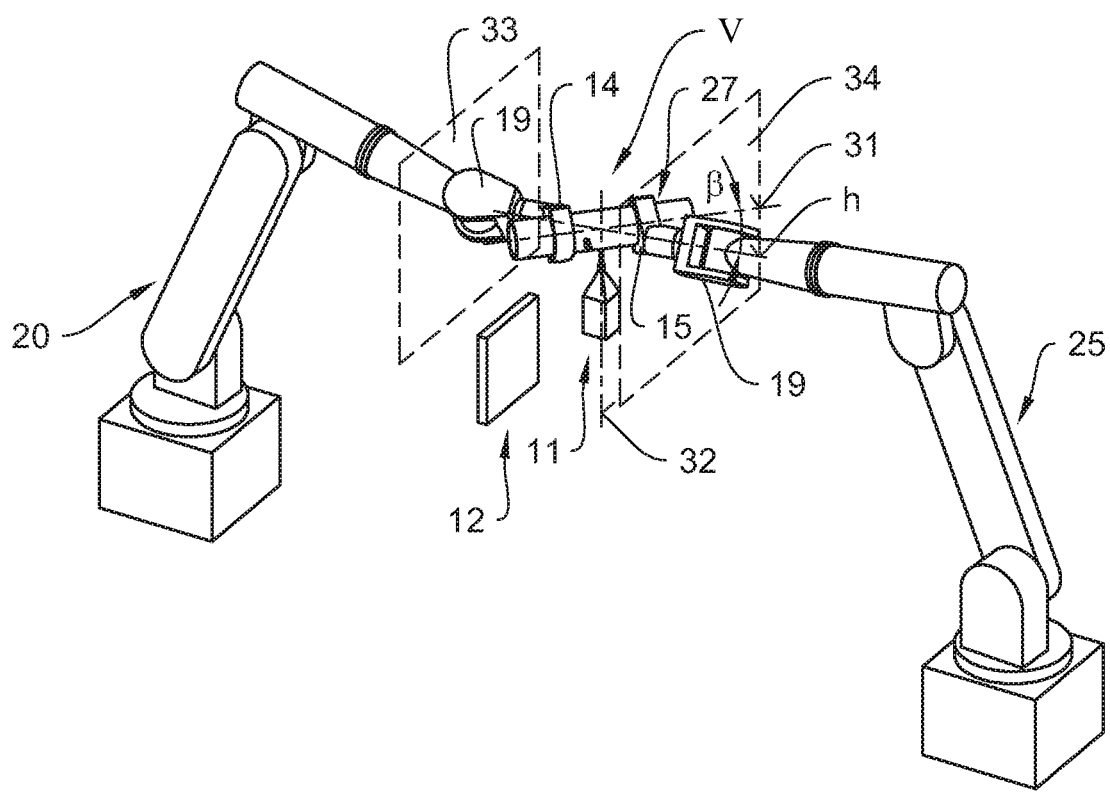

As FIG. 2 shows, the pipe 27 has in the present case been withdrawn from the magazine means 26 by means of the gripping means 14 and has been transferred into the processing starting position IV directly adjacent to the tool means 11, the pipe 27 being grasped by gripping means 14 at one pipe end 29 so that the pipe 27, as it is illustrated in FIG. 3, is grasped by gripping means 15, which is disposed opposite gripping means 14 on the other side of a processing plane defined by the way in which the tool means 11 and the contact heating appliance 12 are disposed, at its second pipe end 30 and is transferred into the processing position V illustrated in FIG. 3, in which the pipe 27 is disposed in such a way that its longitudinal axis 31 has a defined angle α to the tool axis 32 of the tool means 11.

Figure 8:
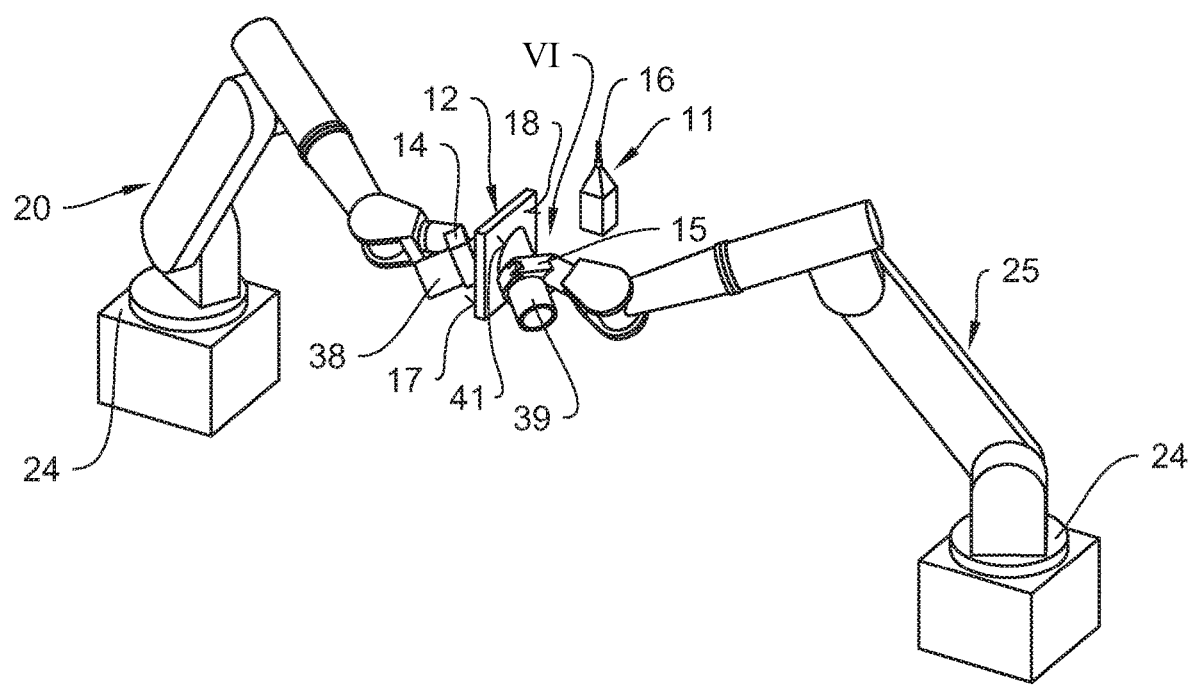
FIG. 8 shows the heating-up of welding contact surfaces, which are formed at the pipe segments, at a contact heating appliance.

As it becomes clear from a combined view of FIGS. 4 to 7, the pipe 27 is rotated about its longitudinal axis 31 in the processing position V of the pipe 27, the longitudinal axis 31 simultaneously tumbling about the point of intersection of the tool axis 32 with the horizontal h with a tumbling angle β formed between the horizontal h and the longitudinal axis 31. For performing this tumbling motion, the hand joints 19 of the articulated robots 20, 25, at which the gripping means 14, 15 are disposed in each case, are moved on a circular path in movement planes 33, 34 which are parallel with respect to each other. A separating plane 37 is defined parallel to the movement planes 33, 34 between them by the tool axis 32 (FIG. 5), the pipe 27 being separated into two pipe segments 38, 39 as a consequence of the proceeding relative movement of the pipe 27 (FIG. 7) so that the gripping means 14, 15 which are moved through the operating zone 13 by the articulated robots 20, 25 in the following, as it is illustrated in FIG. 8, can position welding contact surfaces 40, 41 of the pipe segments 38, 39, said welding contact faces being formed by the separating cut of the end mill 16, against a contact heating surface 17, 18 in each case and that the welding contact surfaces 40, 41 are melted in a heating-up position VI.

Figure 9:
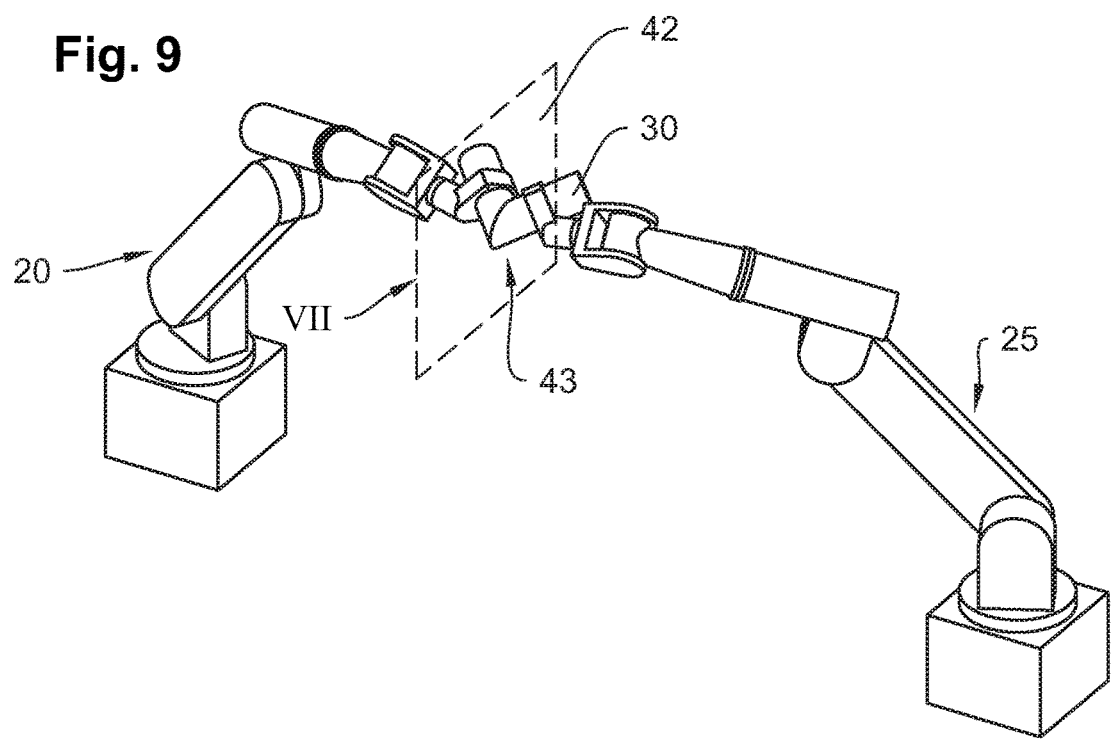
FIG. 9 shows the joining process between the welding contact surfaces for forming a pipe connection.

Subsequently, the pipe segments 38, 39 are transferred into a joining position VII (illustrated in FIG. 9) adjacent to the contact heating appliance 16, the welding contact surfaces 40, 41 of the pipe segments which are disposed in a joining plane 41 being pressed against each other in this joining position, the pipe segments being twisted by 180° relative to the way in which they are disposed in FIG. 6 after the separating cut has been realised, in order to form a material connection and a pipe connection 43 being produced from the pipe segments 38, 39.

Figure 10:
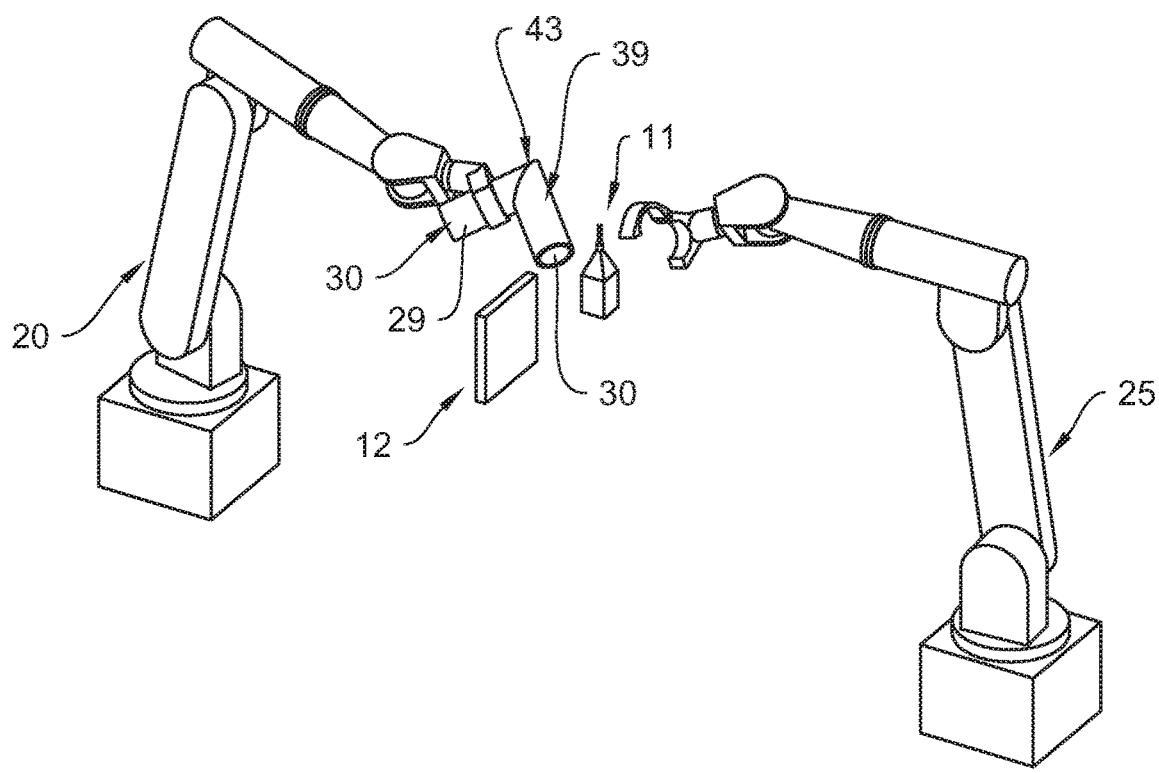
FIG. 10 shows the handling of the finished pipe connection.

After the material connection has set, the second pipe end 30 held by gripping means 15 is released so that gripping means 14, which is moved in the operating zone 13 by means of the articulated robot 20, can transport the pipe connection 43, which is formed from the pipe segments 38, 39, to another magazine means (not illustrated in more detail here) for receiving pipe connections 43, as it is illustrated in FIG. 10.

Alternatively, it is also possible that gripping means 14 keeps the finished pipe connection 43 grasped or changes its grip, now grasping pipe end 30, which is released by gripping means 15, the pipe connection 43 in the following being transferred into another processing starting position IV (illustrated in FIG. 2) so that gripping means 15 is able to grasp a free pipe end 44 of the pipe connection 43, like in the method phase illustrated in FIG. 3, in order to again perform the method steps explained before regarding the pipe 27 at a pipe leg 45 of the pipe connection 43 formed by pipe segment 39 so that finally a pipe connection 48 which is illustrated by way of example FIG. 11 and is composed of three pipe segments 38, 46, 47 can be produced after another joining process has been performed, pipe segments 46 and 47 being formed from original pipe segment 39.

As it becomes clear from the above explanation of the method, complex pipe connections having multiple pipe segments disposed one following the other and being connected at different pipe angles $δ_1$, $δ_2$ can thus be continuously produced.

The invention claimed is:

1. A method for producing a butt-welded joint between a first pipe segment and a second pipe segment (38, 39) of a pipe (27, 28) made of a weldable plastic material, each of the first and second pipe segment held by a respective first and second gripping means (14, 15), pipe end cross-sections of the pipe segments (38, 39) being machined with the aid of a tool means (11) for forming welding contact surfaces (40, 41), said welding contact surfaces (40, 41) being melted by means of a heating means (12) and in the following being pressed against each other with a joining pressure for forming a butt weld which connects the pipe segments (38, 39) with each other in a joining plane (42), characterised in that said tool means (11) is disposed in a stationary manner in a separating plane (37) for machining the welding contact surfaces (40, 41) and in that a separating cut for forming the pipe segments (38, 39) is realised by each of the first and second gripping means (14, 15) moving the pipe (27, 28) relative to the tool means (11) in the separating plane (37), said separating cut simultaneously serving to form the welding contact surfaces (40, 41).

2. The method according to claim 1, characterised in that each of the first and second gripping means (14, 15) is guided by a handling means on a circular movement path in a movement plane (33, 34) which is parallel to the separating plane (37) in order to perform the relative movement.

3. The method according to claim 2, characterised in that machining of the pipe end cross-sections for forming the welding contact surfaces (40, 41), heating-up of the welding contact surfaces (40, 41) and joining of the welding contact surfaces (40, 41) take place in a common processing plane which is disposed between the handling means.

4. The method according to claim 1, characterised in that the pipe (27) is grasped at a pipe end (29) by the first gripping means (14) before the separating cut is realised and is displaced from a supply position III into a starting position for processing IV adjacent to the tool means (11), a second pipe end (30) being grasped by the second gripping means (15) in said starting position for processing IV and both gripping means (14, 15) placing the pipe (27) at the disposal of a cutting tool of the tool means (11) for realising the separating cut.

5. The method according to claim 1, characterised in that each of the first and second gripping means (14, 15) move each of the pipe segments (38, 39) until their welding contact surfaces (40, 41) are in contact with a heating surface (17, 18) of the heating means (12), which is disposed between the welding contact surfaces (40, 41), after the separating cut has been realised.

6. The method according to claim 1, characterised in that after the welding contact surfaces (40, 41) have been heated, the welding contact surfaces (40, 41) are arranged opposite each other and parallel to each other and are moved against each other by way of a supply movement which is performed by at least one of the first and second (14, 15) and serves to form a material connection in a joining plane (42).

7. The method according to claim 1, characterised in that the welding contact surfaces (40, 41) are heated up by means of a heating means (12) which is disposed adjacent to the tool means (11) in a stationary manner and in that the pipe segments (38, 39) are joined in a joining position VII adjacent to the heating means (12).

8. A device for producing a butt-welded joint between two pipe segments (38, 39), comprising first and second gripping means (14, 15) for holding one of the pipe segments (38, 39) in each case which are to be connected, a tool means (11) for forming welding contact surfaces (40, 41) by machining pipe end cross-sections of the pipe segments (38, 39) and a heating means (12) for melting said welding contact surfaces (40, 41), characterised in that the tool means (11) is disposed in a stationary manner and in that the first and second gripping means (14, 15) can be moved independently of each other in the direction of the spatial axes for handling the pipe segments (38, 39) relative to the tool means (11), wherein each of the gripping means (14, 15) is disposed at a handling means having multiple movement axes, and the handling means are embodied as robots having at least five axes.

9. The device according to claim 8, characterised in that the heating means (12) is disposed in a stationary manner and adjacent to the tool means (11).

10. The device according to claim 8, characterised in that the tool means (11) and the heating means (12) are disposed in a common processing plane between the handling means which are each disposed in a stationary manner.

11. The device according to claim 8, characterised in that the heating means is embodied as a contact heating appliance.

12. The device according to claim 8, characterised in that the heating means is embodied as a radiant heating appliance.

\* \* \* \* \*